US008913498B2

(12) United States Patent
Lee

(10) Patent No.: US 8,913,498 B2
(45) Date of Patent: Dec. 16, 2014

(54) PRIORITY ASSIGNING SCHEME

(75) Inventor: Hyoung-Gon Lee, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 6 days.

(21) Appl. No.: 13/580,225

(22) PCT Filed: Nov. 30, 2011

(86) PCT No.: PCT/US2011/062651
§ 371 (c)(1),
(2), (4) Date: Aug. 21, 2012

(87) PCT Pub. No.: WO2013/081605
PCT Pub. Date: Jun. 6, 2013

(65) Prior Publication Data
US 2013/0135997 A1 May 30, 2013

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 4/00* (2009.01)
*H04M 11/00* (2006.01)

(52) U.S. Cl.
USPC ........... 370/235; 370/328; 370/329; 370/252; 455/406

(58) Field of Classification Search
CPC ..... H04W 4/001; H04W 4/005; H04W 4/008; H04W 4/02; H04W 4/021; H04W 4/023; H04W 4/025; H04W 4/16; H04W 72/00; H04W 28/00; H04L 45/00; H04L 67/00; H04L 47/00
USPC ......... 370/329, 328, 252, 352, 235, 236, 312, 370/338, 392, 320; 455/406, 453.3; 709/226
See application file for complete search history.

(56) References Cited

U.S. PATENT DOCUMENTS 7,046,643 B1 * 5/2006 Zellner et al. ................ 370/329
7,162,540 B2 * 1/2007 Jasen et al. ................... 709/242
7,633,869 B1 * 12/2009 Morris et al. ................. 370/232
7,940,713 B2   5/2011 Jin et al.
(Continued)

FOREIGN PATENT DOCUMENTS

WO   0042789 A1   7/2000

OTHER PUBLICATIONS

Janevski, T.; QoS framework for wireless IP networks; Oct. 3, 2003; Telecommunications in Modern Satellite, Cable and Broadcasting Service, 2003. TELSIKS 2003. 6th International Conference on; 112-115 vol. 1.*

(Continued)

*Primary Examiner* — Benjamin H Elliott, IV
*Assistant Examiner* — Eric Nowlin
(74) *Attorney, Agent, or Firm* — Brundidge & Stanger, P.C.

(57) ABSTRACT

Technologies are generally described for a priority assigning scheme considering a type of data traffic. In some examples, a method may include analyzing a request for data traffic, determining a type of the data traffic, and assigning priority based on the type of the data traffic.

13 Claims, 6 Drawing Sheets

(56) References Cited

U.S. PATENT DOCUMENTS

| | | | | |
|---|---|---|---|---|
| 7,962,649 | B2* | 6/2011 | King et al. | 709/240 |
| 2002/0093925 | A1* | 7/2002 | Chuah | 370/332 |
| 2004/0120266 | A1* | 6/2004 | Ko et al. | 370/252 |
| 2005/0271010 | A1* | 12/2005 | Capretta | 370/329 |
| 2007/0136783 | A1* | 6/2007 | Shelest et al. | 726/1 |
| 2010/0322220 | A1* | 12/2010 | Brown et al. | 370/338 |

OTHER PUBLICATIONS

Rosen, E., Tappan, D., Fedorkow, G., Rekhter, Y., Farinacci, D., Li, T., and A. Conta, "MPLS Label Stack Encoding", IETF, www.ietf.org, Jan. 2001; RFC 3032.*

AbuAli, N. ,Hayajneh, M. ,Hassanein, H.; Congestion-Based Pricing Resource Management in Broadband Wireless Networks; Jun. 28, 2010; IEEE Communications Society; Wireless Communications, IEEE Transactions on (vol. 9 , Issue: 8 ); pp. 2600-2610.*

DaSilva; Pricing for QoS-enabled networks: A survey; Nov. 24, 2009; IEEE Communications Society; Communications Surveys & Tutorials, IEEE (vol. 3 , Issue: 2 ); pp. 2-8.*

3GPP, TS 23.107: Quality of Service (QoS) Concept and Architecture Release 9, Jun. 6, 2010, ETSI, Version 9.1.0, pp. 13-20.*

Strategic White Paper, The LTE Network Architecture, A comprehensive tutorial, 2009, pp. 1-26, accessed via www.alcatel-lucent.com.

Australian Patent Office, International search report and written opinion of the International Searching Authority for PCT/US2011/062651, mailed on Mar. 13, 2012, Australia.

* cited by examiner

PRIORITY ASSIGNING SCHEME

BACKGROUND

In wireless communication systems, QoS (Quality of Service) management has been performed based on simple classification of generated traffics. For example, for QoS management, traffics are classified into voice, video, best-effort, background, etc. Such a simple classification of traffic is likely that user's intentions are not reflected on the whole. For example, when a user device receives an e-mail from an e-mail server, there may be a case where an e-mail client checks new e-mails periodically on a predetermined time basis, while there may be another case where the e-mail client checks new e-mails in accordance with a user's refresh command. In aspect of data traffic, both of two cases cannot be distinguished because for the e-mail server, both are refresh requests on e-mail.

SUMMARY

In an example, a method may include analyzing a request for data traffic, determining a type of the data traffic, and assigning priority based on the type of the data traffic.

In an example, a priority assigning system may include a data traffic type determining unit configured to determine whether data traffic is associated with user-intended traffic or non-user-intended traffic, and a priority assigning unit configured to assign priority based on whether the data traffic is associated with the user-intended traffic or the non-user-intended traffic.

In an example, a pricing system may include a data traffic type determining unit configured to determine whether data traffic is associated with user-intended traffic or non-user-intended traffic, a priority assigning unit configured to assign priority based on whether the data traffic is associated with the user-intended traffic or the non-user-intended traffic, and a price determining unit configured to determine a price for the data traffic based on the priority.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
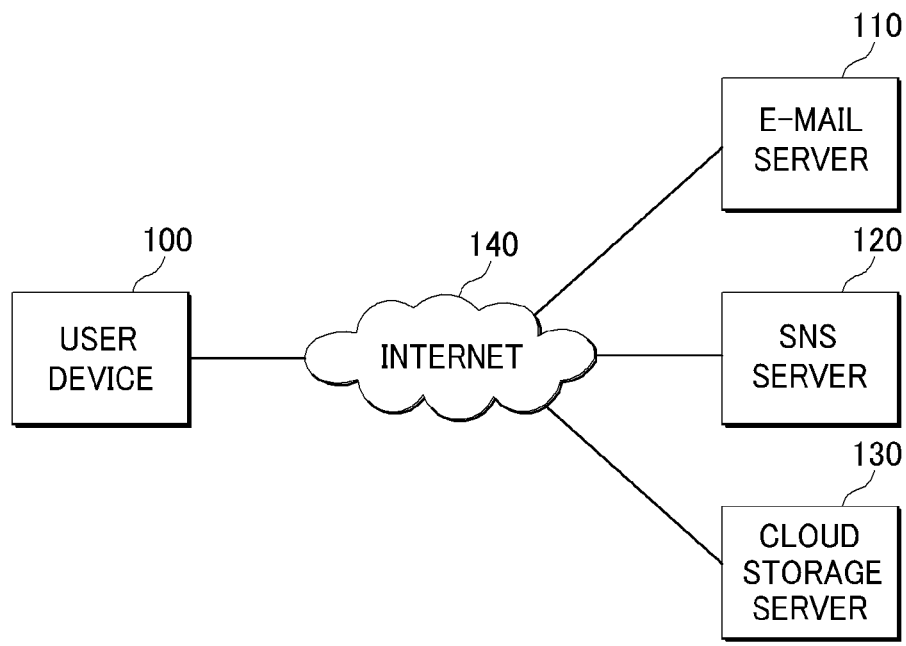
FIG. 1 schematically shows an illustrative example of a wireless communication system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a priority assigning scheme for wireless communication systems.

Briefly stated, technologies are generally described for a priority assigning scheme considering a type of data traffic. In some examples, a priority assigning system may determine the type of the data traffic, e.g., whether the data traffic is associated with user-intended traffic or non-user-intended traffic, and assign priority based on the type of the data traffic. In some examples, the priority assigning system may assign first priority for the user-intended traffic and assign second priority for the non-user-intended traffic. In some examples, the first priority may be same as or higher than the second priority. In some examples, the priority assigning system may assign time-varying priority for the non-user-intended traffic.

In some examples, a pricing scheme may be associated with the priority assigning scheme. In some examples, a pricing system may determine a price for data traffic based on the priority assigned for the data traffic. In some examples, the pricing system may charge a first price for the user-intended traffic with the first priority and a second price for the non-user-intended traffic with the second priority. In some examples, the first price may be higher than the second price.

FIG. 1 schematically shows an illustrative example of a wireless communication system, in accordance with at least some embodiments described herein. As depicted in FIG. 1, a user device 100 may communicate with an e-mail server 110, an SNS (Social Network Service) server 120, and a cloud storage server 130 via the Internet 140. By way of example, but not limitation, via the Internet 140, user device 100 may download new e-mails from e-mail server 110 so that a user of user device 100 may check the new e-mails, or upload a new message to e-mail server 110 so that the user may send the message to others, download recent posts from SNS server 120 so that the user may check the recent posts, or upload a new post to SNS server 120 so that the user may share his/her post with others, or upload data to cloud storage server 130 for backing up the data to reduce the risk of data loss, or download data from cloud storage server 130, and so on. Although FIG. 1 illustrates one user device communicating or interacting with one e-mail server, one SNS server, and one cloud storage server, it should be appreciated by one skilled in the relevant art that any number of devices may communicate with any type of and/or any number of servers or storages.

In some embodiments, user device 100 may send a request for data traffic to e-mail server 110 for downloading data traffic, e.g., new e-mails, from e-mail server 110. The data traffic may be associated with user-intended traffic or non-user-intended traffic. By way of example, but not limitation, in cases where user device 100 downloads or tries to download new e-mails in accordance with the user's refresh or reload command, the data traffic may be associated with the user-intended traffic, while in cases where user device 100 downloads or tries to download new e-mails periodically, the data traffic may be associated with the non-user-intended traffic. In some embodiments, the request may include traffic type information such as an indication of user intention, i.e., information indicating whether the requested data traffic is user-intended or non-user-intended. By way of example, but not limitation, in cases where the data traffic is non-user-intended and periodically-generated, the traffic type information may include at least one of information indicating a period of data traffic generation and information indicating whether the period of data traffic generation has been changed or not.

In some embodiments, e-mail server 110 may determine a type of the requested data traffic, i.e., whether the requested data traffic is associated with user-intended traffic or non-user-intended traffic, based at least in part on the request received from user device 100. In some embodiments, e-mail server 110 may determine the type based at least in part on the traffic type information.

In some embodiments, e-mail server 110 may assign priority based at least in part on the type of the data traffic. In some embodiments, e-mail server 110 may assign first priority for the user-intended traffic and assign second priority for the non-user-intended traffic. By way of example, but not limitation, the first priority for the user-intended traffic may be same as or higher than the second priority for the non-user-intended traffic. By way of example, but not limitation, the first priority may be set as "higher priority" while the second priority may be set as "normal priority" or "lower priority," or the first priority may be set as "normal priority" while the second priority may be set as "lower priority."

By way of example, but not limitation, the non-user-intended traffic may include at least one of periodically-generated traffic, automatically-generated traffic, and scheduled traffic. In cases where the requested data traffic is associated with periodically-generated traffic, e-mail server 110 may send the requested traffic, i.e., new e-mails, to user device 100 within a predetermined period of data traffic generation.

Figure 2:
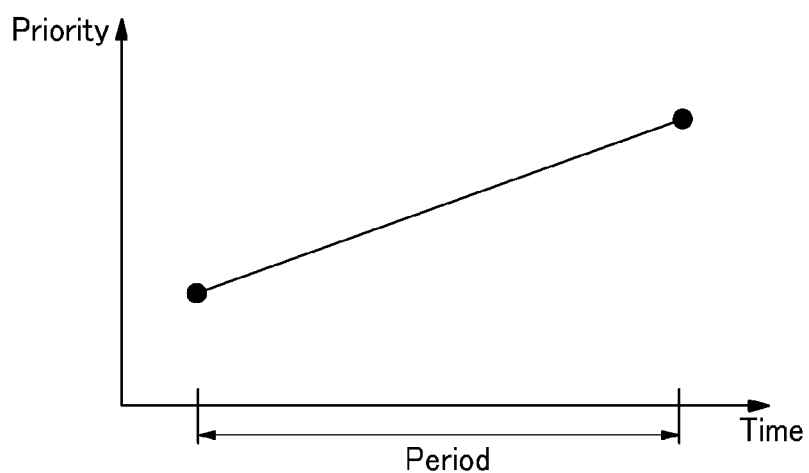
FIG. 2 shows an illustrative example of priority assigned for periodically-generated data traffic.

In some embodiments, e-mail server 110 may assign time-varying priority for the non-user-intended traffic. By way of example, but not limitation, in cases where the data traffic is periodically-generated, e-mail server 110 may assign relatively lower priority at the beginning of the period, while assign relatively higher priority at the end of the period, as illustrated in FIG. 2, which shows an illustrative example of priority assigned for periodically-generated data traffic in accordance with at least some embodiments described herein. In such cases, the lower priority at the beginning of the period may contribute to effective use of a network, and the increasing of the priority during the period may ensure processing of the data traffic within the period.

Referring to FIG. 1 again, in some embodiments, user device 100 may send a request for data traffic to SNS server 120 for downloading data traffic, e.g., new posts, from SNS server 120. The data traffic may be associated with user-intended traffic or non-user-intended traffic. By way of example, but not limitation, in cases where user device 100 downloads or tries to download new posts in accordance with the user's refresh or reload command, the data traffic may be associated with the user-intended traffic, while in cases where user device 100 downloads or tries to download new posts periodically, the data traffic may be associated with the non-user-intended traffic. In some embodiments, the request may include traffic type information such as an indication of user intention, i.e., information indicating whether the requested data traffic is user-intended or non-user-intended.

In some embodiments, SNS server 120 may determine a type of the requested data traffic, i.e., whether the requested data traffic is associated with user-intended traffic or non-user-intended traffic, based at least in part on the request received from user device 100. In some embodiments, SNS server 120 may determine the type based at least in part on the traffic type information.

In some embodiments, SNS server 120 may assign priority based at least in part on the type of the data traffic. In some embodiments, SNS server 120 may assign first priority for the user-intended traffic and assign second priority for the non-user-intended traffic. By way of example, but not limitation, the first priority for the user-intended traffic may be same as or higher than the second priority for the non-user-intended traffic.

By way of example, but not limitation, the non-user-intended traffic may include at least one of periodically-generated traffic, automatically-generated traffic, and scheduled traffic. In cases where the requested data traffic is associated with periodically-generated traffic, SNS server 120 may send the requested traffic, i.e., new posts, to user device 100 within a predetermined period of data traffic generation.

In some embodiments, SNS server 120 may assign time-varying priority for the non-user-intended traffic. By way of example, but not limitation, in cases where the data traffic is periodically-generated, SNS server 120 may assign relatively lower priority at the beginning of the period, while assign relatively higher priority at the end of the period, as illustrated in FIG. 2.

In some embodiments, user device 100 may send a request for data traffic to cloud storage server 130 for downloading data from cloud storage server 130 and/or performing synchronization with cloud storage server 130. The data traffic may be associated with user-intended traffic or non-user-intended traffic. By way of example, but not limitation, in cases where user device 100 performs or tries to perform synchronization with cloud storage server 130 in accordance with the user's command, the data traffic may be associated with the user-intended traffic, while in cases where user device 100 performs or tries to perform synchronization with cloud storage server 130 periodically, the data traffic may be associated with the non-user-intended traffic. In some embodiments, the request may include traffic type information such as an indication of user intention, i.e., information indicating whether the requested data traffic is user-intended or non-user-intended.

In some embodiments, cloud storage server 130 may determine a type of the requested data traffic, i.e., whether the requested data traffic is associated with user-intended traffic or non-user-intended traffic, based at least in part on the request received from user device 100. In some embodiments, cloud storage server 130 may determine the type based at least in part on the traffic type information.

In some embodiments, cloud storage server 130 may assign priority based at least in part on the type of the data traffic. In some embodiments, cloud storage server 130 may assign first priority for the user-intended traffic and assign second priority for the non-user-intended traffic. By way of example, but not limitation, the first priority for the user-intended traffic may be same as or higher than the second priority for the non-user-intended traffic.

By way of example, but not limitation, the non-user-intended traffic may include at least one of periodically-generated traffic, automatically-generated traffic, and scheduled traffic. In cases where the requested data traffic is associated with periodically-generated traffic, cloud storage server 130 may send the requested traffic to user device 100 within a predetermined period of data traffic generation.

In some embodiments, cloud storage server 130 may assign time-varying priority for the non-user-intended traffic. By way of example, but not limitation, in cases where the data traffic is periodically-generated, cloud storage server 130 may assign relatively lower priority at the beginning of the period, while assign relatively higher priority at the end of the period, as illustrated in FIG. 2.

In some embodiments, user device 100 may send data to cloud storage server 130 and save or back up the data in cloud storage server 130. The data traffic caused by the transmission and saving of the data may be associated with user-intended traffic or non-user-intended traffic. By way of example, but not limitation, in cases where user device 100 sends or tries to send the data to cloud storage server 130 in accordance with the user's save command, the data traffic may be associated with the user-intended traffic, while in cases where user device 100 sends or tries to send the data to cloud storage server 130 periodically, the data traffic may be associated with the non-user-intended traffic. In some embodiments, the data sent from user device 100 to cloud storage server 130 may include traffic type information such as an indication of user intention, i.e., information indicating whether the data traffic is user-intended or non-user-intended.

Figure 3:
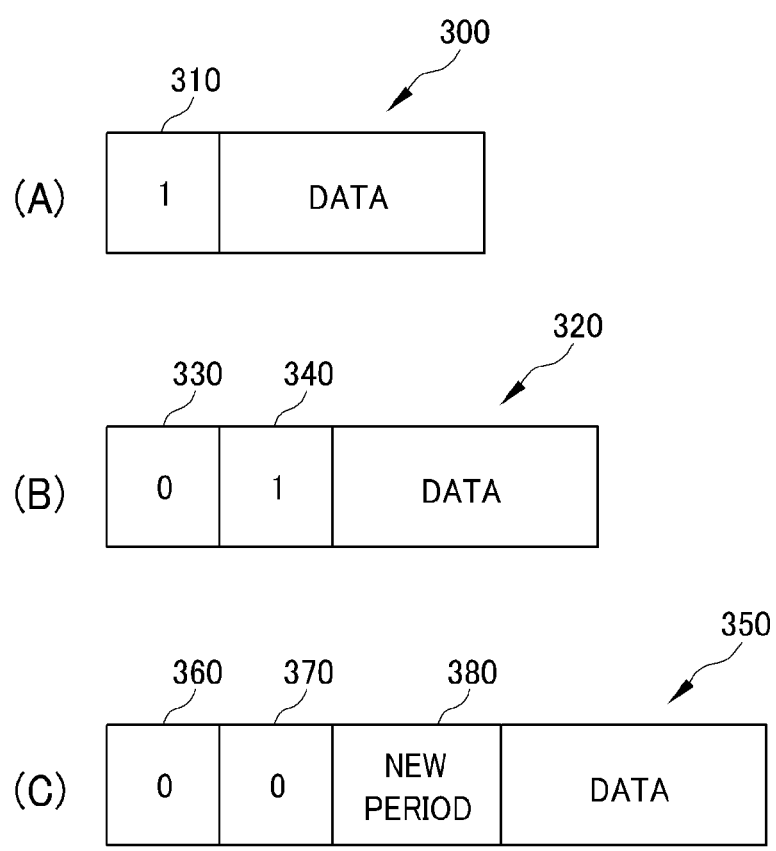
FIGS. 3(A)-(C) show illustrative examples of data packets under an example priority assigning scheme.

FIGS. 3(A)-(C) show illustrative examples of data packets sent from user device 100 to cloud storage server 130 under an example priority assigning scheme in accordance with at least some embodiments described herein. As depicted in FIGS. 3(A)-(C), data packets 300, 320 and 350 may respectively include user intention flags 310, 330 and 360 denoting user intentions. By way of example, but not limitation, "1" in user intention flag 310 as in FIG. 3(A) may indicate that the data traffic is user-intended, while "0" in user intention flags 330 and 360 as in FIGS. 3(B)-(C) may indicate that the data traffic is non-user-intended. In cases where the data traffic is non-user-intended as in FIGS. 3(B)-(C), data packets 320 and 350 may further include period change flags 340 and 370, respectively, indicating whether the period of data traffic generation has been changed or not. By way of example, but not limitation, "1" in period change flag 340 as in FIG. 3(B) may indicate that the period of data traffic generation has not been changed, while "0" in period change flag 370 as in FIG. 3(C) may indicate that the period of data traffic generation has been changed. In cases where the period of data traffic generation has been changed as in FIG. 3(C), data packet 350 may include information 380 indicating a newly changed period of data traffic generation.

Referring to FIG. 1 again, in some embodiments, cloud storage server 130 may determine a type of the data traffic, i.e., whether the data traffic is associated with user-intended traffic or non-user-intended traffic, based at least in part on the data received from user device 100, and assign priority based at least in part on the type of the data traffic. In some embodiments, cloud storage server 130 may assign first priority for the user-intended traffic and assign second priority for the non-user-intended traffic. By way of example, but not limitation, the first priority for the user-intended traffic may be same as or higher than the second priority for the non-user-intended traffic.

Figure 4:
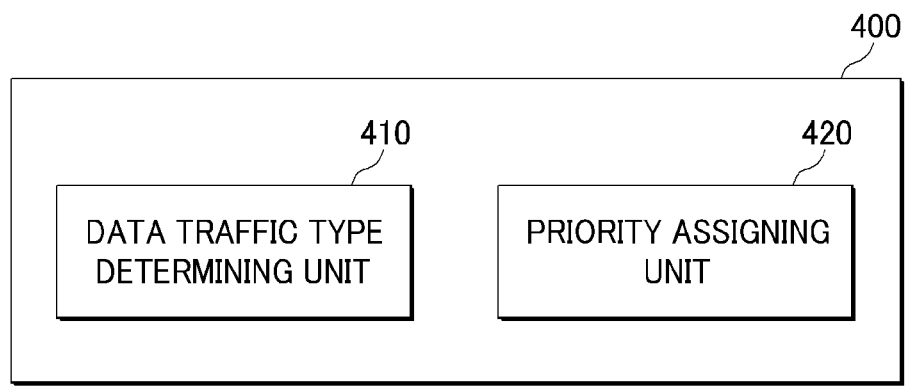
FIG. 4 shows a schematic block diagram of an illustrative example of a priority assigning system.

FIG. 4 shows a schematic block diagram of an illustrative example of a priority assigning system in accordance with at least some embodiments described herein. In some embodiments, a priority assigning system may be implemented as a component of e-mail server 110, SNS server 120 and cloud storage server 130 illustrated in FIG. 1, or as a separate component interacting with e-mail server 110, SNS server 120 and cloud storage server 130 illustrated in FIG. 1. As depicted in FIG. 4, a priority assigning system 400 may include a data traffic type determining unit 410 and a priority assigning unit 420. Although illustrated as discrete components, various components may be divided into additional components, combined into fewer components, or eliminated while being contemplated within the scope of the disclosed subject matter.

Data traffic type determining unit 410 may be configured to determine a type of data traffic. In some embodiments, data traffic type determining unit 410 may determine whether the data traffic is associated with user-intended traffic or non-user-intended traffic.

Priority assigning unit 420 may be configured to assign priority based on the type of the data traffic determined by data traffic type determining unit 410. In some embodiments, priority assigning unit 420 may assign the priority based on whether the data traffic is associated with the user-intended traffic or the non-user-intended traffic. In some embodiments, priority assigning unit 420 may assign first priority for the user-intended traffic and assign second priority for the non-user-intended traffic. By way of example, but not limitation, the first priority may be same as or higher than the second priority. In some embodiments, priority assigning unit 420 may assign time-varying priority for the non-user-intended traffic.

Figure 5:
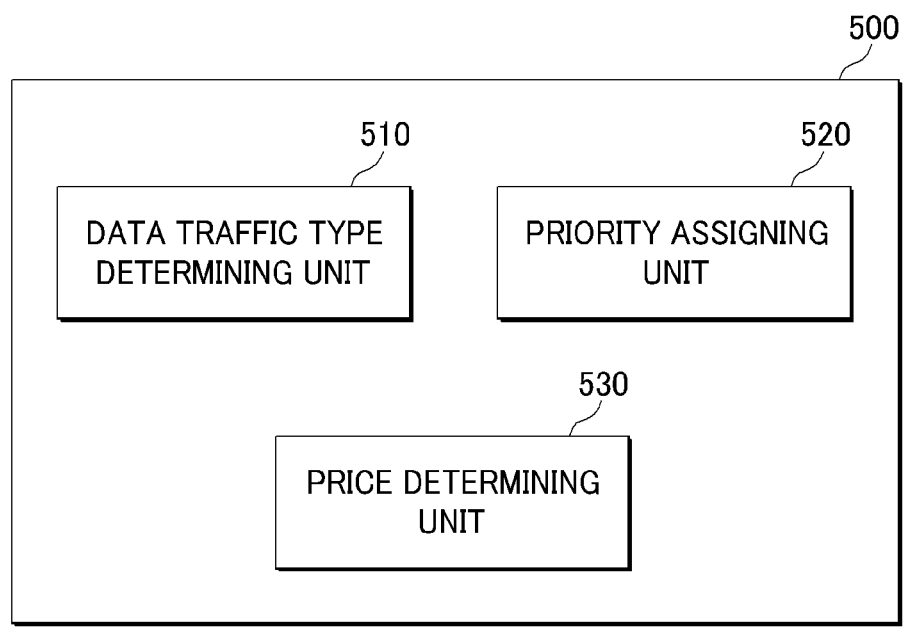
FIG. 5 shows a schematic block diagram of an illustrative example of a pricing system.

FIG. 5 shows a schematic block diagram of an illustrative example of a pricing system in accordance with at least some embodiments described herein. In some embodiments, a pricing system may be implemented as a component of e-mail server 110, SNS server 120 and cloud storage server 130 illustrated in FIG. 1, or as a separate component interacting with e-mail server 110, SNS server 120 and cloud storage server 130 illustrated in FIG. 1. As depicted in FIG. 5, a pricing system 500 may include a data traffic type determining unit 510, a priority assigning unit 520 and a price determining unit 530. Although illustrated as discrete components, various components may be divided into additional components, combined into fewer components, or eliminated while being contemplated within the scope of the disclosed subject matter.

Data traffic type determining unit 510 may be configured to determine a type of data traffic. In some embodiments, data traffic type determining unit 510 may determine whether the data traffic is associated with user-intended traffic or non-user-intended traffic.

Priority assigning unit 520 may be configured to assign priority based on the type of the data traffic determined by data traffic type determining unit 510. In some embodiments, priority assigning unit 520 may assign the priority based on whether the data traffic is associated with the user-intended traffic or the non-user-intended traffic. In some embodiments, priority assigning unit 520 may assign first priority for the user-intended traffic and assign second priority for the non-user-intended traffic. By way of example, but not limitation, the first priority may be same as or higher than the second priority. In some embodiments, priority assigning unit 520 may assign time-varying priority for the non-user-intended traffic.

Price determining unit 530 may be configured to determine a price for the data traffic based on the priority assigned by priority assigning unit 520. In some embodiments, price determining unit 530 may charge a first price for the first priority and a second price for the second priority. In some embodiments, the first price may be higher than the second price. In some embodiments, price determining unit 530 may determine the price in proportion to the priority. In some embodiments, in cases for a price structure in which a certain limited amount of data usage is provided with a fixed fee, price determining unit 530 may adjust amount of data to be subtracted instead of the price, based on the priority.

Figure 6:
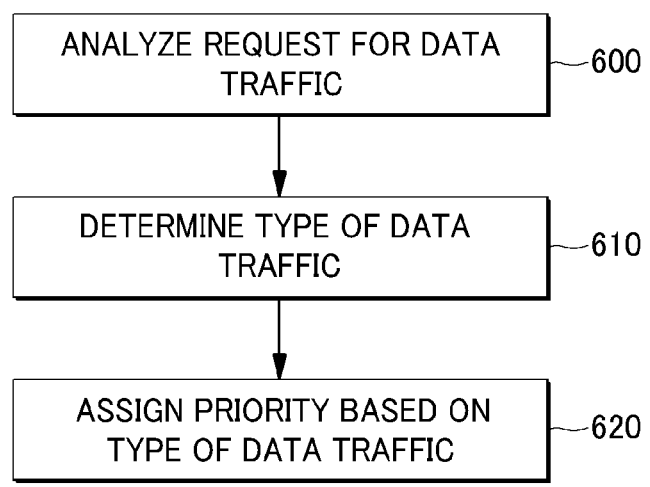
FIG. 6 shows an example flow diagram of a process for assigning priority.

FIG. 6 shows an example flow diagram of a process for assigning priority in accordance with at least some embodiments described herein. The method in FIG. 6 can be implemented in a priority assigning system such as priority assigning system 400 illustrated in FIG. 4. An example process may include one or more operations, actions, or functions as illustrated by one or more blocks 600, 610 and/or 620. Although illustrated as discrete blocks, various blocks may be divided into additional blocks, combined into fewer blocks, or eliminated, depending on the desired implementation. Processing may begin at block 600.

At block 600, the priority assigning system may analyze a request for data traffic sent from a user device. In some embodiments, the priority assigning system may analyze the request for data traffic sent from an application on the user device. In some embodiments, the priority assigning system may analyze traffic type information contained in the request for data traffic or sent from the user device together with the request for data traffic. By way of example, but not limitation, the traffic type information may include information indicating whether the data traffic is user-intended or non-user-intended. Processing may continue from block 600 to block 610.

At block 610, the priority assigning system may determine a type of the data traffic based at least in part on the result of analysis of the request for data traffic. In some embodiments, the priority assigning system may determine whether the requested data traffic is associated with user-intended traffic or non-user-intended traffic. In some embodiments, the priority assigning system may determine the type of the data traffic based at least in part on the traffic type information. Processing may continue from block 610 to block 620.

At block 620, the priority assigning system may assign priority based at least in part on the type of the data traffic. In some embodiments, the priority assigning system may assign first priority for the user-intended traffic and assign second priority for the non-user-intended traffic. In some embodiments, the first priority may be same as or higher than the second priority. In some embodiments, the priority assigning system may assign time-varying priority for the non-user-intended traffic.

Although it is illustrated that the method in FIG. 6 may be implemented by the priority assigning system, one skilled in the art will appreciate that the method in FIG. 6 can also be implemented in a pricing system such as pricing system 500 illustrated in FIG. 5. By way of example, but not limitation, the pricing system may perform at least one of the processes in blocks 600, 610 and 620, and further perform associating price information for the data traffic with the priority or with the type of the data traffic.

Further, one skilled in the art will also appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
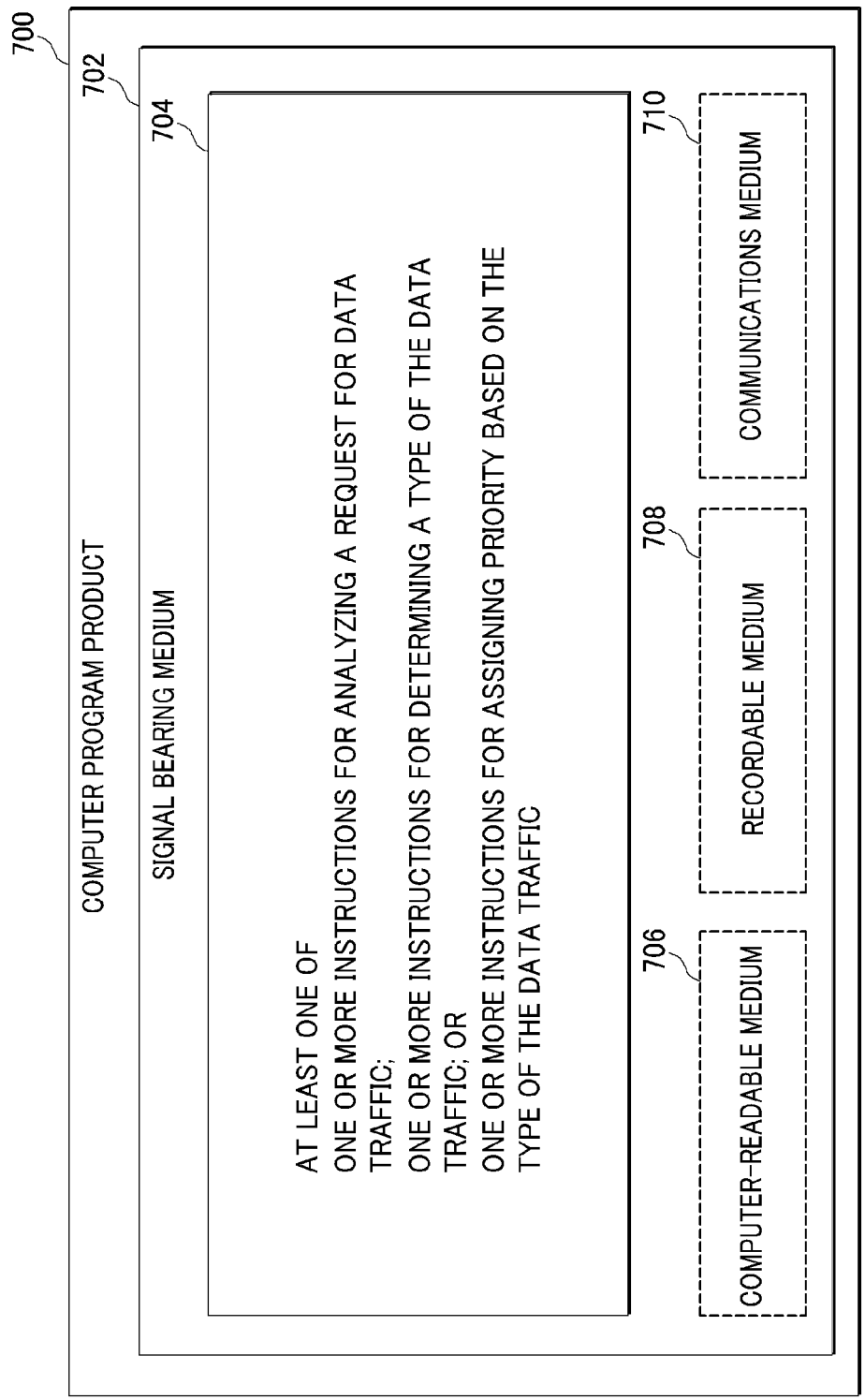
FIG. 7 illustrates computer program products that can be utilized to provide a priority assigning scheme.

FIG. 7 illustrates computer program products that can be utilized to provide a priority assigning scheme in accordance with at least some embodiments described herein. Program product 700 may include a signal bearing medium 702. Signal bearing medium 702 may include one or more instructions 704 that, when executed by, for example, a processor, may provide the functionality described above with respect to FIGS. 1-6. By way of example, instructions 704 may include: one or more instructions for analyzing a request for data traffic; one or more instructions for determining a type of the data traffic; or one or more instructions for assigning priority based on the type of the data traffic. Thus, for example, referring to the system of FIG. 4, priority assigning system 400 may undertake one or more of the blocks shown in FIG. 6 in response to instructions 704.

In some implementations, signal bearing medium 702 may encompass a computer-readable medium 706, such as, but not limited to, a hard disk drive, a compact disc (CD), a digital versatile disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of priority assigning system 400 by an RF signal bearing medium 702, where the signal bearing medium 702 is conveyed by a wireless communications medium 710 (e.g., a wireless communications medium conforming with the IEEE 802.11 standard).

Figure 8:
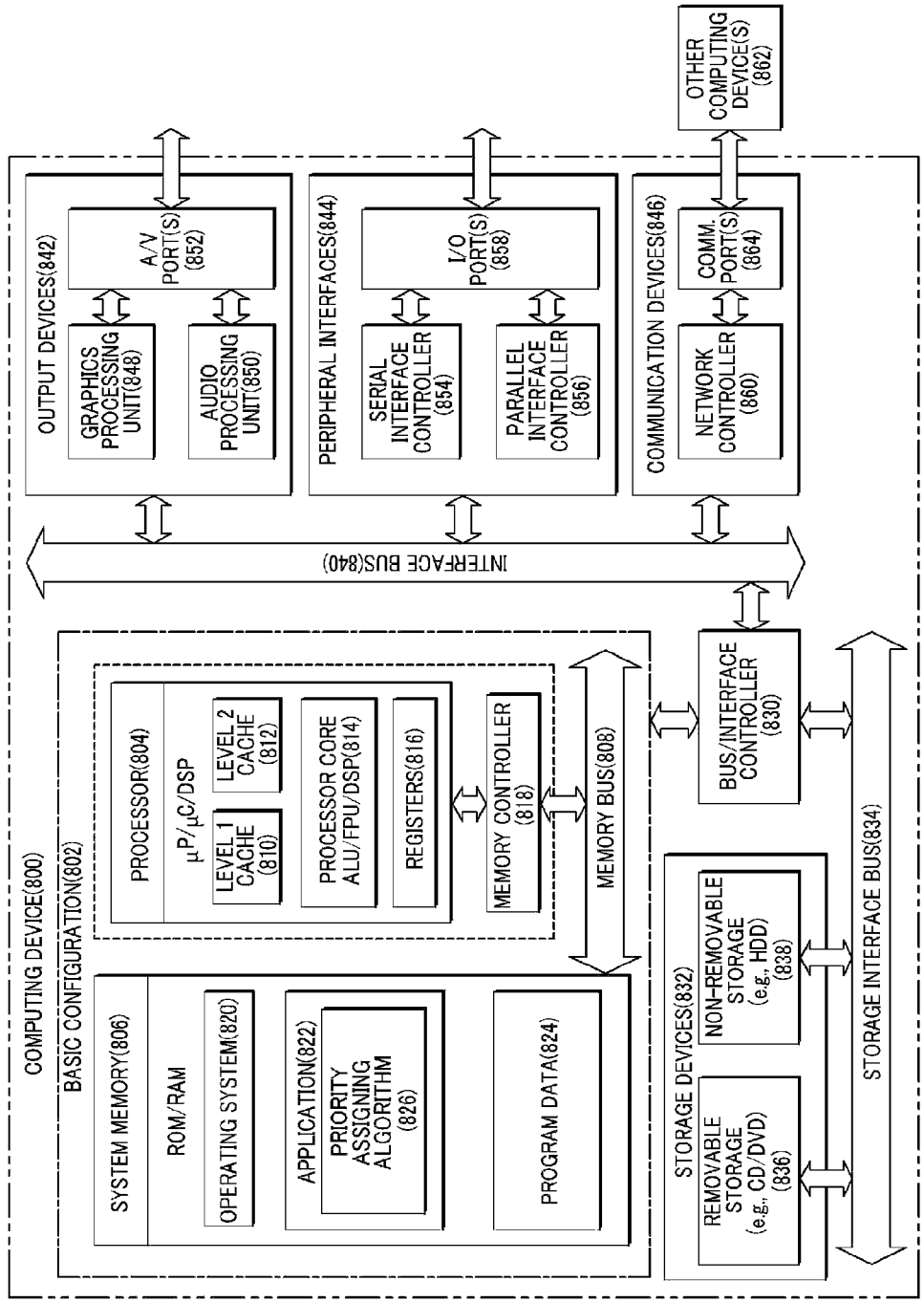
FIG. 8 is a block diagram illustrating an example computing device that can be utilized to provide a priority assigning scheme, all arranged in accordance with at least some embodiments described herein.

FIG. 8 is a block diagram illustrating an example computing device that can be utilized to provide a priority assigning scheme in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may typically be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824.

Application 822 may include a priority assigning algorithm 826 that is arranged to perform the functions as described herein including those described previously with respect to FIGS. 1-7. Program data 824 may include any data that may be useful for providing a priority assigning scheme as is described herein. In some embodiments, application 822 may be arranged to operate with program data 824 on operating system 820 such that a priority assigning scheme may be provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A server-based method for assigning priority, comprising:
    analyzing a request for data traffic, the analyzing including analyzing traffic type information,
        wherein the traffic type information includes information indicating whether the data traffic is user-intended or non-user-intended, and if the data traffic is non-user-intended and periodically generated, the traffic type information further includes at least one of information indicating a predetermined time period of data traffic generation, and information indicating whether the predetermined time period of data traffic generation has been changed or not;
    determining a type of the data traffic,
        wherein the determining the type of the data traffic includes determining whether the data traffic is associated with user-intended traffic or non-user-intended traffic, and
        wherein the user-intended traffic includes the data traffic associated with a user's command, and the non-user-intended traffic includes at least one of periodically-generated traffic, automatically-generated traffic, and scheduled traffic; and assigning priority based on the type of data traffic,
        wherein the assigning the priority based on the type of the data traffic includes assigning time-varying priority within the predetermined time period for the periodically-generated traffic, and
        wherein the periodically-generated traffic includes the data traffic periodically generated within the predetermined time period.

2. The method of claim 1, wherein the assigning the priority based on the type of the data traffic includes assigning first priority for the user-intended traffic and assigning second priority for the non-user-intended traffic, and
    wherein the first priority is same as or higher than the second priority.

3. The method of claim 1, further comprising:
    processing the data traffic within the predetermined time period.

4. The method of claim 1, further comprising:
    associating price information with the type of the data traffic.

5. The method of claim 4, wherein the determining the type of the data traffic includes determining whether the data traffic is associated with the user-intended traffic or the non-user-intended traffic, and
    wherein the associating the price information with the type of the data traffic includes charging a first price for the user-intended traffic and a second price for the non-user-intended traffic, the first price being higher than the second price.

6. The method of claim 1, further comprising:
    associating price information for the data traffic with the priority.

7. The method of claim 6, wherein the associating the price information for the data traffic with the priority includes assigning a price in proportion to the priority.

8. A priority assigning system, comprising:
    a user device configured to:
        transmit a request for data traffic; and
    a server configured to:
        analyze traffic type information, wherein the traffic type information includes information indicating whether the data traffic is user-intended or non-user-intended, and if the data traffic is non-user-intended and periodically generated, the traffic type information further includes at least one of information indicating a predetermined time period of data traffic generation, and information indicating whether the predetermined time period of data traffic generation has been changed or not;
        determine whether the data traffic is associated with user-intended traffic or non-user-intended traffic; and
        assign priority based on whether the data traffic is associated with the user-intended traffic or the non-user-intended traffic, wherein the user-intended traffic includes the data traffic associated with a user's command, and the non-user-intended traffic includes at least one of periodically-generated traffic, automatically-generated traffic, and scheduled traffic, wherein the server is further configured to assign time-varying priority within the predetermined time period for the periodically-generated traffic, and wherein the periodically-generated traffic includes the data traffic periodically generated within the predetermined time period.

9. The priority assigning system of claim 8, wherein the server is further configured to assign first priority for the user-intended traffic and assign second priority for the non-user-intended traffic, and wherein the first priority is same as or higher than the second priority.

10. A pricing system, comprising:

a user device configured to:

transmit a request for data traffic; and a server configured to:

analyze traffic type information, wherein the traffic type information includes information indicating whether the data traffic is user-intended or non-user-intended, and if the data traffic is non-user-intended and periodically generated, the traffic type information further includes at least one of information indicating a predetermined time period of data traffic generation, and information indicating whether the predetermined time period of data traffic generation has been changed or not;

determine whether the data traffic is associated with user-intended traffic or non-user-intended traffic;

assign priority based on whether the data traffic is associated with the user-intended traffic or the non-user-intended traffic, wherein the user-intended traffic includes the data traffic associated with a user's command, and the non-user-intended traffic includes at least one of periodically-generated traffic, automatically-generated traffic, and scheduled traffic, wherein the server is further configured to assign time-varying priority within the predetermined time period for the periodically-generated traffic, and wherein the periodically-generated traffic includes the data traffic periodically generated within the predetermined time period; and determine a price for the data traffic based on the priority.

11. The pricing system of claim 10, wherein the server is further configured to assign first priority for the user-intended traffic and assign second priority for the non-user-intended traffic, and wherein the first priority is same as or higher than the second priority.

12. The pricing system of claim 10, wherein the server is further configured to determine the price in proportion to the priority.

13. The method of claim 1, wherein the assigning the priority based on the type of the data traffic includes assigning lower priority at the beginning of the predetermined time period and higher priority at the end of the predetermined time period for the periodically-generated data traffic.

\* \* \* \* \*

UNITED STATES PATENT AND TRADEMARK OFFICE
CERTIFICATE OF CORRECTION

| | | |
|---|---|---|
| PATENT NO. | : 8,913,498 B2 | Page 1 of 1 |
| APPLICATION NO. | : 13/580225 | |
| DATED | : December 16, 2014 | |
| INVENTOR(S) | : Lee | |

It is certified that error appears in the above-identified patent and that said Letters Patent is hereby corrected as shown below:

In the Specification

In Column 1, below Title, insert -- CROSS-REFERENCE TO RELATED APPLICATIONS
The present application is a U.S. national stage filing under 35 U.S.C. §371 of International Application No. PCT/US2011/062651, filed on Nov. 30, 2011. --.

In the Claims

In Column 12, Line 14, in Claim 1, delete "of" and insert -- of the --, therefor.

In Column 12, Line 29, in Claim 3, delete "traffic within" and insert -- traffic at a time within --, therefor.

Signed and Sealed this
Ninth Day of June, 2015

Michelle K. Lee
*Director of the United States Patent and Trademark Office*